United States Patent [19]

Ōyashiki et al.

[11] Patent Number: 5,754,165
[45] Date of Patent: May 19, 1998

[54] IMAGE SEQUENCE PROCESSOR FOR PERSONAL COMPUTER

[75] Inventors: Masahiko Ōyashiki; Ryosuke Nishiguchi; Hidenori Kawamura, all of Tokyo, Japan

[73] Assignee: NEC System Integration & Construction, Ltd., Tokyo, Japan

[21] Appl. No.: 523,885

[22] Filed: Sep. 6, 1995

[51] Int. Cl.[6] .................................................. G09G 5/04
[52] U.S. Cl. ................................................ 345/154; 345/113
[58] Field of Search .................................. 345/154, 153, 345/150, 112, 132, 186, 187, 113, 115; 348/458, 459, 445

[56] References Cited

U.S. PATENT DOCUMENTS

| | | | |
|---|---|---|---|
| 4,599,611 | 7/1986 | Bowker. | |
| 4,689,613 | 8/1987 | Ikeda | 345/153 |
| 4,721,951 | 1/1988 | Holler | 345/154 |
| 5,327,156 | 7/1994 | Masukane et al. | 345/113 |

FOREIGN PATENT DOCUMENTS

| | | |
|---|---|---|
| 4142885 | 5/1992 | Japan. |
| 0646334 | 2/1994 | Japan. |

*Primary Examiner*—Regina Liang
*Attorney, Agent, or Firm*—Joseph C. Mason, Jr.

[57] ABSTRACT

It is sought to display a pluralities of full motion image sequences together with personal computer texts, graphics, etc. on a personal computer display. NTSC signal converters 100 (10A, 10B, . . .) each provided for each video input channel each send out color digital brightness signals of a contracted image size, obtained through conversion of a video input signal. These signals are written in and read out from R, G and B color signal memories 20 under control of a command from a write/read controller 23. The read-out color digital brightness signals are converted in a digital-to-analog converter 30 into analog signals. An overlay controller 31 overleys these analog signals over R, G and B analog inputs from a personal computer under control of a display position determining signal supplied from a CPU via a personal computer bus 41, thus producing R, G and B analog outputs which are displayed as image sequence on the same personal computer display. For the display of a plurality of image sequences, the NTSC signal converter and color signal memories (20e, 20g and 20b) are provided for each video input channel.

3 Claims, 4 Drawing Sheets

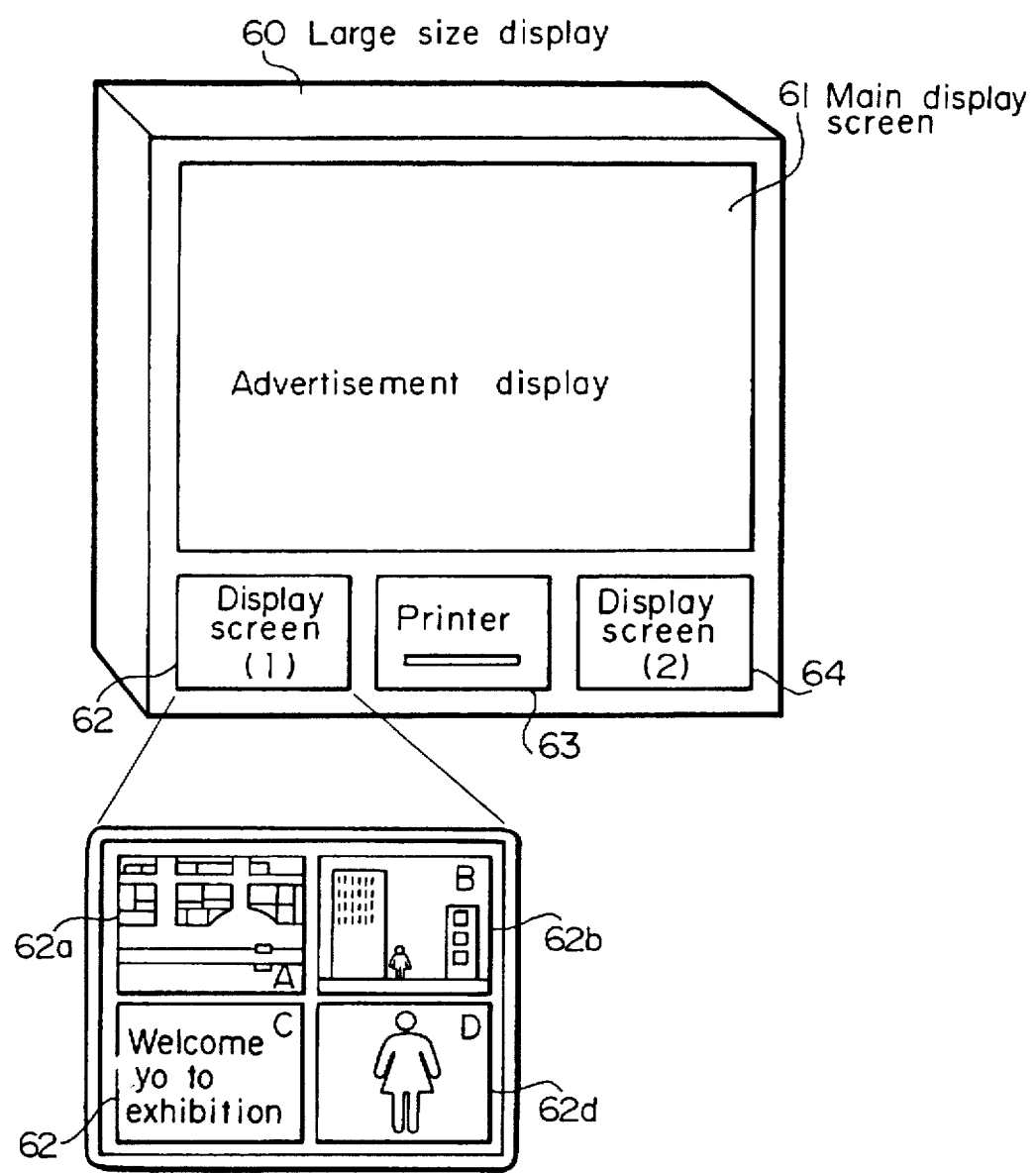

IMAGE SEQUENCE PROCESSOR FOR PERSONAL COMPUTER

BACKGROUND OF THE INVENTION

1. Field of the Invention

This invention relates to an image sequence processor for personal computer to process video and cause display of image sequence on a personal computer display.

2. Prior Art

In the prior art, one of a plurality of video input signals is selected by an input selector for conversion into a digital signal to be written in a display memory area designated by a CPU and displayed as image sequence on a video display area of a personal computer display screen.

However, despite a plurality of video inputs only a single one thereof is displayed on the display, and this imposes some restriction on the scope of utilization.

SUMMARY OF THE INVENTION

The invention has been intended in view of the problem noted above, and it has an object of providing a processor for personal computer, which processes video for displaying a plurality of full motion image sequences together with personal computer texts and graphics on a personal computer display.

To attain the above object, the processor for personal computer according to the invention, for displaying image sequence on a personal computer display by processing video, comprises a plurality of NTSC (National Television System Commitee) signal converters each provided for each video input channel for converting NTSC signal from each video input channel into R (red), G (green) and B (blue) color digital brightness signals and contracting the converted signals to match a personal computer display size, color signal memories each for writing each of the color digital brightness signals therein, a digital-to-analog converter for converting the color digital brightness signals into R, G and B analog signals, an overlay controller for controlling the overlay of the R, G and B analog signals, and a write/read controller for controlling the writing and reading of data in and from the color signal memories, video being processed by parallel processing for each video input to display a plurality of image sequences on a personal computer display.

According to the invention, an NTSC signal converter and color signal memories are provided for each of a plurality of video input channels. In each NTSC signal converter, synchronizing signal separation and color disassembling are made, and individual color signals are converted into respective color digital brightness signals, while determining an image display size. In color signal memories, the color digital brightness signals are written in FIFO type field memories.

According to synchronizing signal of R, G and B analog input signals generated from a personal computer, a read signal is generated for simultaneously reading out the color digital brightness signals from all the FIFO memories and converting these signals into corresponding analog signals. It is thus possible to display a plurality of video inputs simultaneously as image sequences on the same personal computer display.

BRIEF DESCRIPTION OF THE DRAWINGS

The above and other objects, features and advantages of the invention will become more apparent from the description of the preferred embodiment of the invention when the same is read with reference to the accompanying drawings, in which:

FIG. 3 is a view for describing an information system using the image sequence processor for personal computer according to the invention.

DETAILED DESCRIPTION OF THE PREFERRED EMBODIMENT

Figure 1:
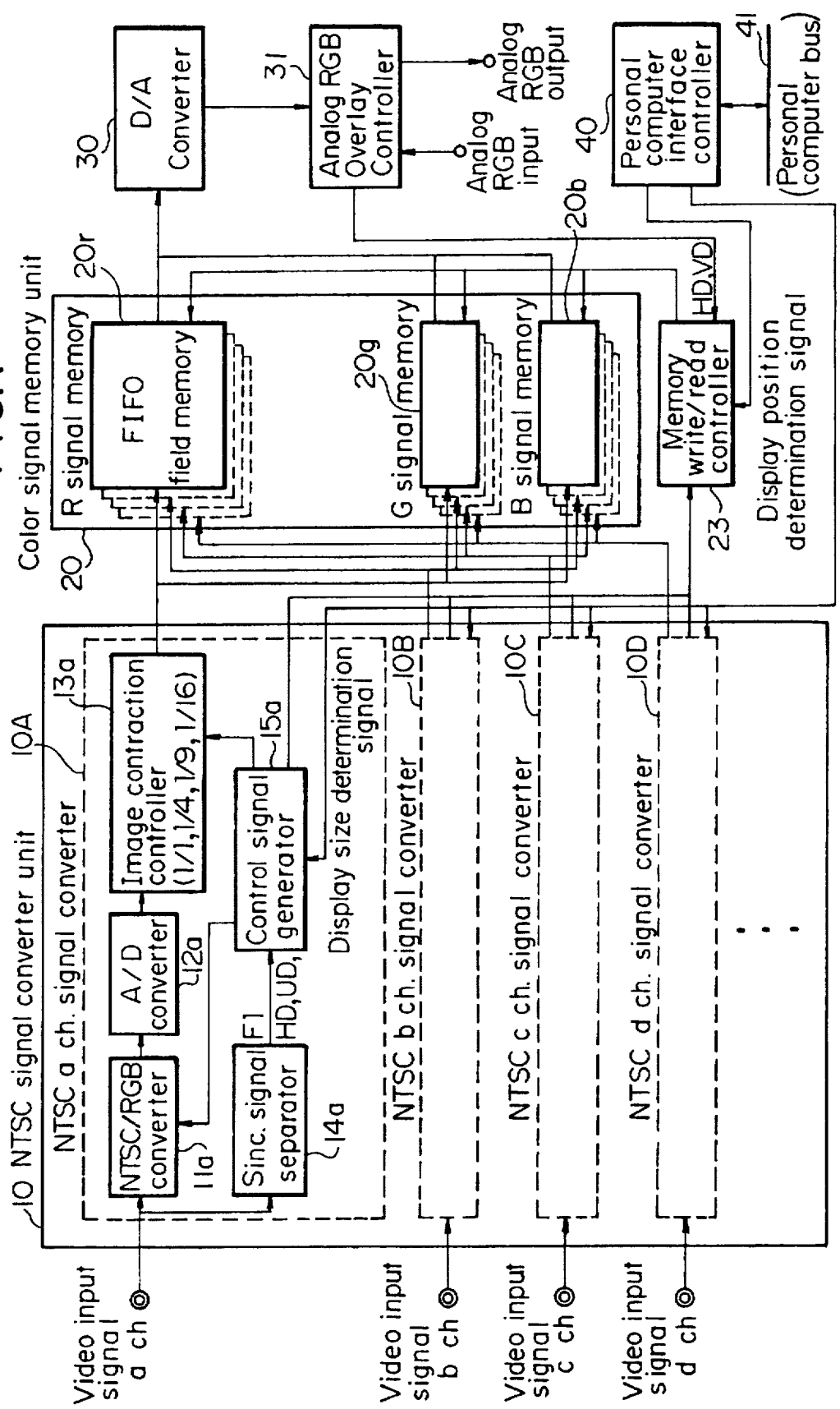
FIG. 1 is a block diagram showing an embodiment of the image sequence processor for personal computer according to the invention.

An embodiment of the invention will now be described with reference to the drawings. FIG. 1 is a block diagram showing an embodiment of the image sequence processor for personal computer.

Referring to the Figure, reference numeral 10 designates an NTSC signal converter unit including a plurality of NTSC signal converters 10A, 10B, . . . each provided for each video input channel.

The NTSC signal converter 10A which is provided for a channel, includes an NTSC/RGB converter 11a for disassembling a video input signal into R (red), G (green) and B (blue) color analog signals, an analog-to-digital converter 12a for converting the R, G and B analog signals into R, G and B digital signals as respective color digital brightness signals, a contraction controller 13a for controlling the contraction of the color digital brightness signals such as to match a display screen size, a synchronizing signal separator 14a for separating a horizontal synchronizing signal, a vertical synchronizing singal and a field discriminating signal from the input video, and a control signal generator 15a for outputting a contraction control signal to the contraction controller 13a.

Reference numeral 20 designates a color signal memory unit which include an R, a G and B signal memory 20r, 20g and 20b provided for each of the individual video input channel NTSC signal converters 10A, 10B, . . . . . The individual field memories are FIFO type field memories.

Reference numeral 23 designates a write/read controller for controlling the writing and reading of signal in and from the color signal memory unit 20.

Reference numeral 30 designates a digital-to-analog converter for converting the color digital brightness signals into R, G and B analog signals, and 31 an analog overlay controller for controlling the overlay of the R, G and B analog signals.

Reference numeral 40 designates a personal computer interface controller for sending out a display size determining signal and a display position determining signal according to an instruction provided from a CPU via a personal computer bus 41.

Now, the operation of the structure described above will be described by taking the a channel as an example.

1. Video input signal is input to the a channel NTSC signal converter 10A.

2. In the NTSC signal converter 10A, the NTSC/RGB converter 11a color disassembles the video input signal into R, G and B analog signals which are sent to the analog-toi-digital converter 12a.

3. The analog-to-digital converter 12a converts the analog input signals into digital signals to generate R, G and B color digital brightness signals which are sent to the contraction controller 13a.

4. The synchronizing signal separator 14a separates a horizontal synchronizing signal, a vertical synchronizing signal and a field discrimination signal from the video input and sends out these signals to the control signal generator 15a. The control signal generator 15a generates a contraction control signal from the horizontal synchronizing signal, vertical synchronizing signal, field discrimination signal and video display size determining signal supplied from the CPU via personal computer bus 41 and personal computer interface controller 40, the contraction control signal thus generated being sent out to the contraction controller 13a.

5. The contraction controller 13a contracts (i.e., compresses) the input color digital brightness signals to 1/1, 1/4, 1/9 and 1/16 of the display screen size according to the contraction control signals, and sends out contraction signals thus provided for the individual colors to the R, G and B signal memories 20r, 20g and 20b.

6. These contraction signals are written in the color signal memories 20r, 20g and 20b in correspondence to the timings of the horizontal and vertical synchronizing signals of the video input signal.

7. The color digital brightness signals are read out from the color signal memories 20r, 20g and 20b with the provision of the R, G and B analog input synchronizing signals from the personal computer and a read signal, which is generated by the memory write/read controller 23 according to the display Position determining signal from the CPU, to the color signal memories 20r, 20g and 20b.

8. The color digital brightness signals read out from the color signal memories 20r, 20g and 20b, are converted in the digital-to-analog converter 30 into R, G and B analog signals and overlaid in the analog overlay controller 31 over R, G and B analog input signals to obtain R, G and B analog outputs which are displayed on a display for the R, G and B analog outputs.

9. The above sequence of steps 1 to 8 is performed for each video input signal frame to realize full motion image sequence display.

10. The display of a plurality of image sequences is possible because the NTSC signal converter and individual color signal memories are provided for each video input signal.

11. Further, since this image sequence processor for personal computer can be connected in series (connection of R, G and B analog outputs to the next stage R, G and B analog inputs), it can readily cope with an increase of the number of video signals to be dealt with.

Figure 2:
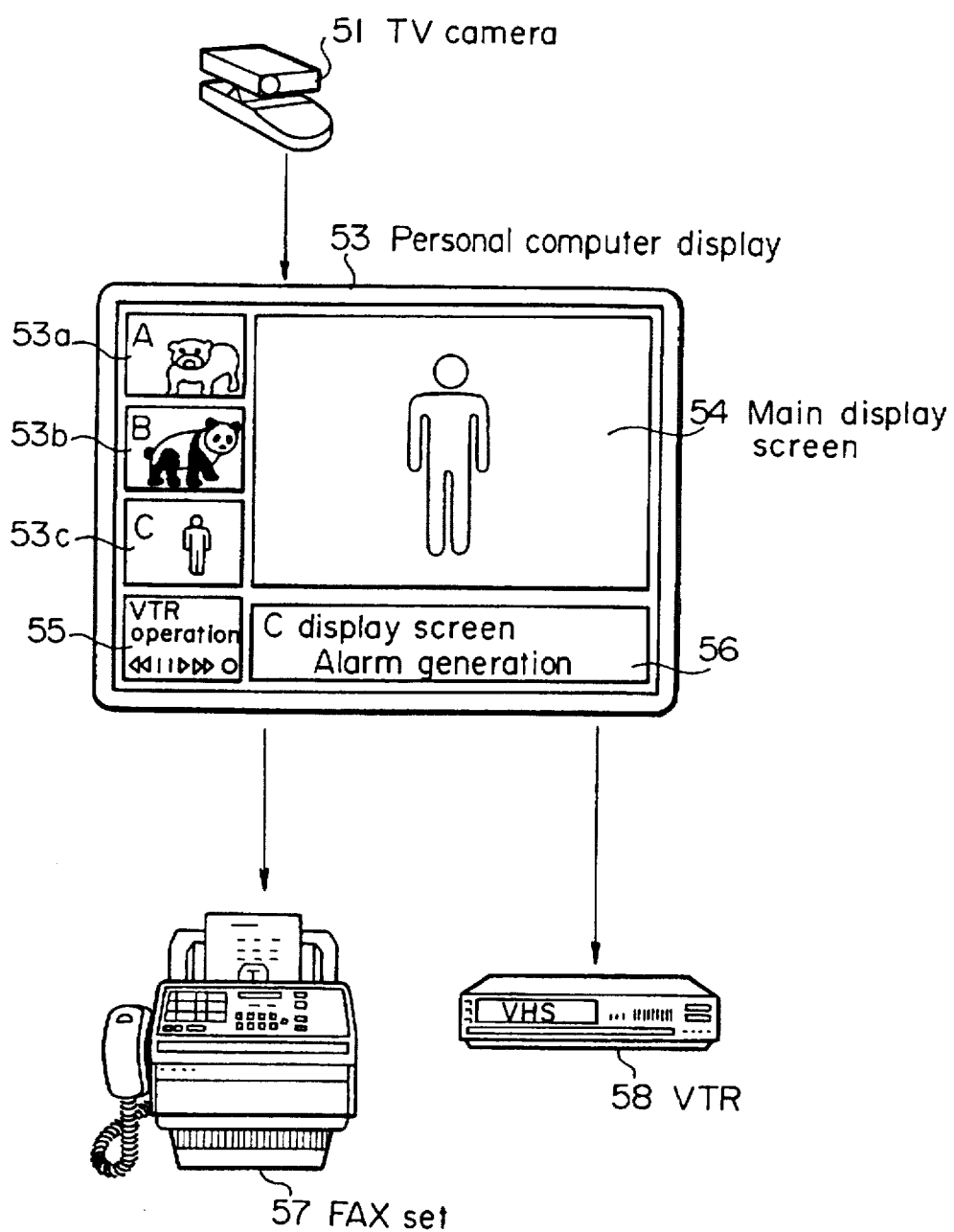
FIG. 2 is a view for describing a monitor system using the image sequence processor for personal computer according to the invention.

FIG. 2 is a view for describing a monitor system using the image sequence processor for personal computer according to the invention.

Referring to the Figure, reference numeral 51 designates a television camera for picking up voice and recording voice. Reference numeral 53 designates a personal computer dislpay, the screen of which is divided for displaying a plurality of image sequences. The division screens are an A screen 53a, a B screen 53b, a C screen 53c, a main screen 54, a VTR operation screen 55, a screen 56 for displaying alarm or like monitor data. Reference numeral 57 designates a FAX set, and 58 a VTR. In FIG. 2, pictures of a dog, a panda and a man picked by by respective three television cameras 51, are displayed on the A, B and C screens 53a, 53b and 53c of the personal computer display 53. On the main screen 54, the image on the C screen 53c that is selected is displayed. On the screen 56 an alarm indicating the generation of abnormality is displayed.

The monitoring personnel checks three monitoring cites on the A, B and C screens 53a, 53b and 53c, and the display on the C screen 53c which requires particular attention is mnitored on the main screen 54. The selection of a cite requiring particular attention is made by the monitoring personnel, through detection of abnormality by a sensor (not shown), through detection of abnormality in an automatic search of the television camera 51 and so forth.

In the example as shown, there is a man in a place which one is prohibited to enter, and an alarm is displayed on the screen 56.

As shown, with this monitor system it is possible to readily make

1. Continuous monitoring of a plurality of cites;
2. interlock to the alarm (such as switching of the screen, scanning with the camera, FAX communication, etc.);
3. Automatic search with the television camera;
4. Installation of a plurality of monitor screens;
5. Ready setting of monitoring cites;
6. Recording of data on the VTR by operating the display on the VTR operation screen.

FIG. 3 is a view for describing an information system using the image sequence processor for personal computer according to the invention.

Referring to the Figure, reference numeral 60 designates a large-size display, which comprises a display section 61 such as a large screen constituted by light-emitting diode (LED) or a liquid crystal display board, a multi-television unit, etc., a display screen (1) 62 for an image sequence processor for personal computer, a printer 63, and a display screen (2) 64 for an image processor for personal computer.

In the FIG. 3 example, the display screen (1) 62 is divided into four division screens 62a to 62d. A guide map is displayed on the A screen 62a, a road and buildings in the course are displayed on the B screen 62b, a greeting message to the visitor is displayed on the C screen 62c, and a call of person in charge of guide is displayed on the D screen 62d.

As the source of information a television camera, a MO (Magnetic optical disc) a HDD (hard disc device), etc. are used.

A person who noted an advertisement or the like displayed on the display section 61 of the large-size display 60 can operate the display screen (1) 62 or the touch panel type division displays of the display screen (2) 64. He or she can know what he or she want to know by display operation, from a print from printer 63, explanation by guide personnel and so forth.

In this example, the guide to the exhibition and call of the guide personnel are displayed on the A to D screens 62a to 62d of the display screen (I) 62.

With the above structure of the information system, the following is readily possible.

1. Touch panel operation from the customer side and mouse operation by the guide personnel.
2. Replying a customer's request with customer's operation and call.
3. Impact by simultaneous use with large screen advertisement display.
4. Announcement of weather, traffic condition, time, event, etc., route guide, introduction of hotels and shops, sight-seeing guide, etc.
5. Guide of a course to a destination with map and image sequence.
6. Storing various data in HDD or MO and displaying these data on the display screens (1) and (2).

Figure 4A:
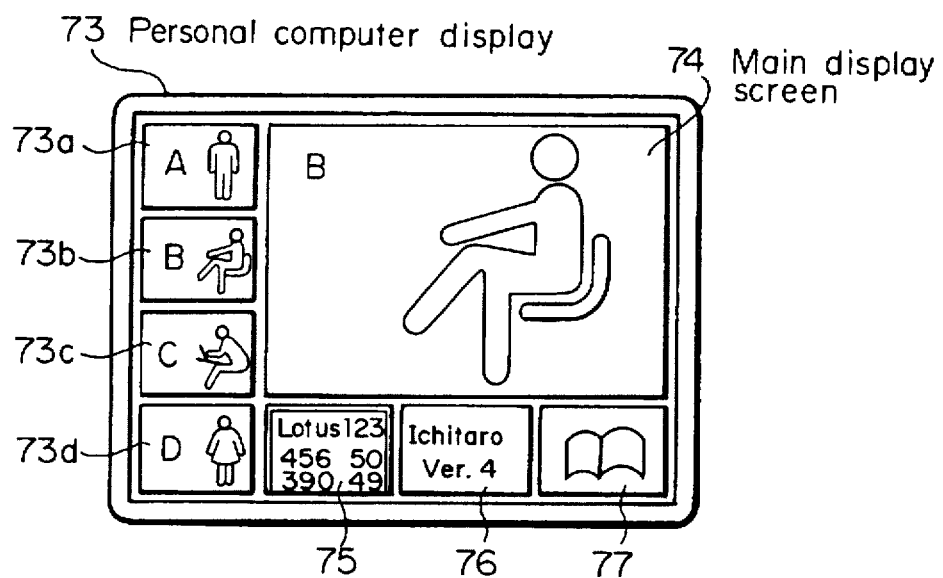
FIGS. 4A and 4B are views for describing a meeting system using the image sequence processor for personal computer according to the invention.
Figure 4B:
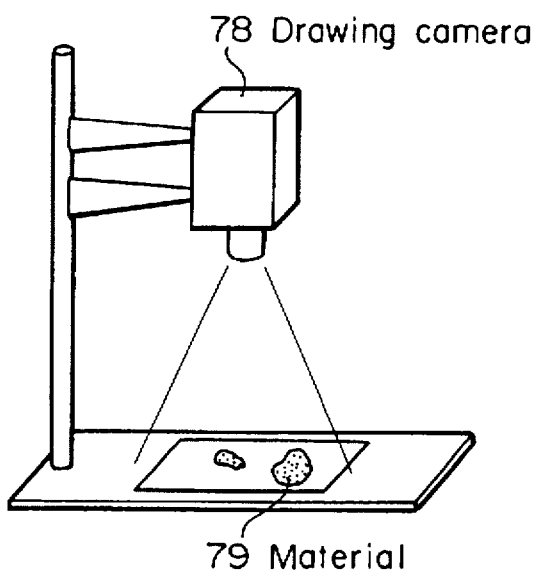

FIGS. 4A and 4B are views for describing a meeting system using the image sequence processor for personal computer according to the invention.

Referring to these Figures, all the members present in a remote place meeting are image sequence displayed on A to D screens 73a to 73d, and a speaker, the chairman, etc. are suitably selected and displayed on a main screen 74.

The video and voice in the meeting hall and of members present in the meeting are recorded with television camera 51, and display document 79 is recorded with document camera 78.

With the above construction of the meeting system, the following is readily possible.

1. Common provision of a plurality of displays.
2. Transmission of image sequence to remote places.
3. Taking out video on personal computer (for table calculation, word processor operation, etc.)
4. Taking out data from document cameras, television broadcast programs and VTRs.
5. Automatic switching of screens by speaker's voice.
6. Transfer of various files.

As has been described in the foregoing, the image sequence processor for personal computer, for displaying image sequence on a personal computer display by processing video, comprises a plurality of NTSC signal converters each provided for each video input channel for converting NTSC signal from each video input channel into R, B and B color digital brightness signals and contracting the converted signals to match a Personal computer display size, color signal memories each for writing each of the color digital brightness signals therein, a digital-to-analog converters for converting the color digital brightness signals into R, G and B analog signals, an overlay controller for controlling the overlay of the R, G and B analog signals, a write/read controller for controlling the writing and reading of data in and from the color signal memories, video being processed by parallel processing for each video input to display a plurality of image sequence on a personal computer display.

It is thus possible to attain the purpose of operation accurately intuitively by observing a plurality of subjects in different displays at a time. Further, it is possible to meet different demands of many people with a single display connected to the processor according to the invention and it is possible to realize multiple media.

While a preferred embodiment of the invention has been described in the foregoing, it is by no means limitative, and changes and modifications may be made without departing from the scope and spirit of the invention.

What is claimed:

1. An image sequence processor for personal computer comprising:

a plurality of NTSC (National Television System Committee) signal converters each provided for each video input channel for converting NTSC signal from each video input channel into R (red), G (green) and B (blue) color digital brightness signals and contracting the converted signals to match a personal computer display size;

color signal memories each for writing each of the color digital brightness signals therein;

a digital-to-analog converter for converting the color digital brightness signals into R, G and B analog signals;

an overlay controller for controlling the overlay of the R, G and B analog signals; and a write/read controller for controlling the writing and reading of data in and from the color signal memories;

video being processed by parallel processing for each video input to display a plurality of image sequences on a personal computer display.

2. The image sequence processor for personal computer according to claim 1, wherein the color signal memories include an R, a G and a B signal memory provided for each of the NTSC signal converters, the individual signal memories being FIFO (first-in first-out) type field memories.

3. An image sequence processor for personal computer comprising:

a plurality of NTSC signal converters each provided for each video input channel for converting NTSC signal from each video input channel into R, G and B color digital brightness signals and contracting the converted signals to match a personal computer display size;

color signal memories each for writing each of the color digital brightness signals therein;

a digital-to-analog converter for converting the color digital brightness signals into R, G and B analog signals;

an overlay controller for controlling the overlay of the R, G and B analog signals;

a write/read controller for controlling the writing and reading of data in and from the color signal memories;

video being processed by parallel processing for each video input to display a plurality of image sequences on a personal computer display;

each of the plurality of the NTSC signal converters having an NTSC/RGB converter for disassembling an NTSC video input signal into R, G and B analog signals;

an analog-to-digital converter for converting the R, G and B analog signals into R, G and B color digital brightness signals;

a contraction controller for controlling the contraction of the color digital brightness signal to match image sizes on the display screen size;

a synchronizing signal separator for separating a horizontal synchronizing signal, a vertical synchronizing signal and a field discrimination signal from the video input; and a control signal generator for outputting a contraction control signal to the contraction controller.

* * * * *